(12) United States Patent
Garlock et al.

(10) Patent No.: US 11,746,925 B2
(45) Date of Patent: Sep. 5, 2023

(54) VALVE PACKING RING SET

(71) Applicant: EGC Operating Company LLC, Chardon, OH (US)

(72) Inventors: Robert Garlock, Chardon, OH (US); Brian Biller, Chardon, OH (US); Thom Jessup, Chardon, OH (US)

(*) Notice: Subject to any disclaimer, the term of this patent is extended or adjusted under 35 U.S.C. 154(b) by 0 days.

(21) Appl. No.: 17/666,792

(22) Filed: Feb. 8, 2022

(65) Prior Publication Data

US 2022/0252181 A1    Aug. 11, 2022

Related U.S. Application Data (60) Provisional application No. 63/147,541, filed on Feb. 9, 2021.

(51) Int. Cl.
*F16J 15/3284*    (2016.01)
*F16K 41/02*    (2006.01)

(52) U.S. Cl.
CPC .......... *F16K 41/02* (2013.01); *F16J 15/3284* (2013.01)

(58) Field of Classification Search
CPC ........ F16J 15/3284; F16J 15/18; F16J 15/181; F16J 15/20; F16J 15/26; F16J 15/32; F16K 41/02
See application file for complete search history.

(56) References Cited

U.S. PATENT DOCUMENTS

| | | | |
|---|---|---|---|
| 5,190,264 A | * | 3/1993 | Boger ................ F16J 15/186 277/522 |
| 2006/0046025 A1 | * | 3/2006 | Latte ................ B32B 15/085 428/421 |
| 2007/0290402 A1 | * | 12/2007 | Edwards ............ B29C 66/14 277/650 |

\* cited by examiner

*Primary Examiner* — Gilbert Y Lee
(74) *Attorney, Agent, or Firm* — Tucker Ellis LLP (57) ABSTRACT

One or more packing systems and/or methods of manufacture are disclosed for a valve seal with lowered emissions while being complaint with fire standards. The packing system may have alternating mid-layers, a top layer, a bottom layer, and a first end cap and a second end cap. The layers can be formed of a flexible graphite-based material and/or a perfluoroalkoxy alkane (PFA) material. The layers may be bonded together and expand under compression to form a seal between a valve stem and a stuffing box.

24 Claims, 11 Drawing Sheets

SECTION A-A

SECTION A-A

SECTION A-A

VALVE PACKING RING SET

CROSS-REFERENCE TO RELATED PATENT APPLICATIONS

This application claims priority to U.S. Provisional Patent Application No. 63/147,541, filed on Feb. 9, 2021, entitled VALVE PACKING RING SET, which is incorporated herein in its entirety.

BACKGROUND

Valve systems for controlling the flow of fluids have a valve stem that is capable of being moved between open and closed positions. In most cases, the valve is provided with a valve stem that extends through the valve body. In order to reduce leakage, or emissions, between the valve stem and the valve body, a packing system may be employed that encircles the valve stem, and seals the area between the packing box and the valve stem. Packing systems may have layers of packing rings which, when subjected to axial compression, are urged to expand radially into sealing engagement with the enclosing cylindrical surfaces of the valve body and stem. The packing system should also allow the valve stem to open and close, which can cause friction between the valve stem, packing system, and valve body. The level of stress, or axial compression, and friction influences the life span of the packing system, due to increased wear potential.

Many fugitive emissions compliant packing rings for valve stems incorporate sealing materials such as rubber or rubber-like material, plastic, and in many cases lubricant materials. These materials however are not usually compliant with fire standards and also do not have temperature ratings acceptable for refinery or other high temperature applications.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more systems and techniques described herein are provided that can be used to seal a valve system. As described herein, a valve packing system is disclosed that may not need as much load as current valve packing systems to provide adequate sealing. Further, such a packing system may provide for less friction to the stem of the valve system during operation, and can utilize materials that are suitable for a wide range of fluids to extend operating conditions, such increased operational pressure and temperature ranges. For example, the valve packing systems described herein are more consistent and reliable for sealability, compressibility and recovery, and can be configured for use in a broader range of applications and operations.

In one implementation, a packing ring is provided that comprises a plurality of mid-layers, respective mid-layers comprising a flexible graphite material or a perfluoroalkoxy alkane (PFA) material, a top layer and a bottom layer, both the top layer and the bottom layer comprising the flexible graphite material, wherein the mid-layers are disposed between the top layer and the bottom layer, and the mid-layers comprise alternating layers of the flexible graphite material and the PFA material, wherein respective layers are disposed parallel to an adjoining layer, wherein the plurality of mid-layers, top layer, and bottom layer are bonded and cylindrical in shape, and an open center, wherein the open center extends through the plurality of mid-layers, top layer, and bottom layers and has an axis perpendicular to the plurality of mid-layers, top layer, and bottom layer. The flexible graphite (e.g., foil) layers being perpendicular to the cylindrical axis, as opposed to being oriented more parallel to the axis (e.g. as in die-molded flexible graphite rings)

In another implementation, a sealing system for a fluid valve is provided that comprises a flexible graphite material or a perfluoroalkoxy alkane (PFA) material, a top layer and a bottom layer, both the top layer and the bottom layer comprising the flexible graphite material, wherein the mid-layers are disposed between the top layer and the bottom layer, and the mid-layers comprise alternating layers of the flexible graphite material and the PFA material, wherein respective layers are disposed parallel to an adjoining layer, wherein the packing ring is cylindrical in shape with an open center, the open center extending through the plurality of mid-layers, top layer, and bottom layer, and has an axis perpendicular to the plurality of layers, and a valve stem, wherein the valve stem extends through the open center and the packing ring forms an interference fit between the valve stem and a stuffing box.

In yet another implementation, a method of manufacturing a packing ring is provided that comprises placing a first layer of flexible graphite material on a first surface of a first layer of PFA material, wherein the PFA material has a second surface opposing the first surface, placing a second layer of flexible graphite material on the second surface of the PFA material, and bonding the layers together. In this implementation, the bonded combination of the PFA layer and the flexible graphite material can be utilized as a mid-layer packing ring in seal for a valve system.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The word "exemplary," if used herein, is to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

The present disclosure relates to packing materials for mitigating the emission of fluids from a fluid valve, and more particularly, to a valve stem packing ring set for sealing between a valve stem and a stuffing box of a valve body, with reduced friction between the valve stem and packing ring set. The packing ring set disclosed herein provides for fluid emission level that meet Environmental Protection Agency (EPA) and other agency fugitive emission standards (API 622,624,641, ISO 15848, TA-LUFT, etc.), while still being compliant with fire standards (API 589, API 607, API 6FA, etc.), and reducing friction.

Many fugitive emissions compliant packing rings for valve stems incorporate sealing materials such as polytetrafluoroethylene (PTFE). However, due to its temperature rating, these packing rings are not usually also compliant with fire standards. For example, PTFE can become gel-like when heated, making it undesirous as a sealant in high-heat environments. Polymer seals containing materials such as PTFE are typically rated for temperatures of 400° F. (205° C.) and below.

Alternatively, as described herein, flexible graphite and fluoropolymers, when used in the correct combination, can be rated to temperatures of 850° F. (450° C.), which can satisfy both fugitive emissions standards, and fire safety standards. In addition, flexible graphite and fluoropolymer materials are chemically compatible with a wide range of fluids, making the combination suitable for most applications. One such fluoropolymer material is perfluoroalkoxy alkane (PFA), which is liquid-like in high-heat environments, and thus is more efficient at sealing than other polymeric materials such as PTFE.

These flexible graphite and fluoropolymer packings however can also present issues. For example, some current flexible graphite and fluoropolymer packings on the market require a higher compressive load in order to seal at levels meeting emission compliance. This higher applied load increases stem friction, resulting in the fluoropolymer coating wearing away at a faster rate, while offering less recovery, and are inconsistent in performance.

A flexible graphite and fluoropolymer packing, with horizontal layers of flexible graphite bonded to horizontal layers of a fluoropolymer, such as PFA, may perform better to meet higher compliance standards, while being more durable than other packings currently available. In addition to the applications disclosed herein, such a packing system may be used for seat seals, body/bonnet gaskets, balance seals, and other sealing elements that have an axial load applied during operation, resulting in radial load and/or movement into adjacent valve components.

FIGS. 1A, 1B, 1C, and 2 are component diagrams illustrating a first exemplary implementation of a packing ring system 100 implementing one or more systems described herein. In this implementation, the packing ring system 100 comprises at least one mid-layer 106 and a top layer 102 and a bottom layer 104. The top layer 102, bottom layer 104, and mid layer 106 may be made of any suitable material for valve sealants, such as a graphite-based material and/or a fluoropolymer material. For a graphite-based material, the material may be laminated and may have additives that exhibit various desirous properties that are chosen based on the application. Such properties may be anti-corrosion and enhanced flexibility properties. Specifically, the additives may actively or passively inhibit corrosion. One such additive may be a phosphorus, barium molybdate, and/or a zinc coating.

Regarding a fluoropolymer material, the material chosen may exhibit various desirous properties that are chosen based on the application. In one example, the fluoropolymer material can comprise perfluoroalkoxy alkane (PFA), which is capable of being melt processed, allowing the material to flow better at working temperatures and low pressure, thus allowing replenishment of the fluoropolymer at the seal interface during use and/or wear, a characteristic not seen with currently used PTFE based packing. The PFA further has increased molecular chain entanglement compared to other fluoropolymer materials, which may provide improved permeation resistance to fluids for which the seal is used. For example, PFA is less permeable than currently used PTFE. Additionally, PFA installed at ambient conditions may exhibit lower cold flow compared to other fluoropolymer materials at common preloads, which, during certain applications, can allow the graphite-based material in the seal to expand radially towards a target valve stem and stuffing box. In this example, the improved radial expansion can provide intimate contact between the valve components and any fluoropolymer product that is present between flexible graphite layers. As an example, the flexible graphite density may be below 80 #/cuft to provide for enough axial to radial movement during compression.

In some implementations, the fluoropolymer material can be combined with the graphite-based material. As an example, PFA and graphite-based sealing material can be combined in a mold, and subjected to a pressurized heat-treatment and forming process, at an appropriate pressure and temperature, for an appropriate amount of time. The resulting product is a sheet or ring seal that is comprised of a graphite-based material infused with the fluoropolymer material. In this example, the resulting sheet or ring seal can be formed (e.g., precision cut) into a mid-layer ring 106 (e.g., and/or a top-layer 102, bottom layer 104) to be used in the exemplary packing ring system 100.

In some implementations, the packing ring system 100 may further be comprised of a first end ring 108 and a second end ring 110. The first end ring 108 can comprise a first skive cut 108a, and the second end ring 110 may comprise a second skive cut 110a. For example, skive cuts (e.g., 108a, 110a) may provide for easier assembly of the seal around a valve stem without needing to fully disassemble a portion of the valve. Further, the skive cuts (e.g., 108a, 110a) may also allow for these portions of the packings to be readily cut from a spool stock of material (E.g., formed as a single roll of stock packing material). The first end ring 108 and the second end ring 110 may be made of any suitable material for containing the top layer 102, bottom layer 104, and mid layer 106.

One such example of a suitable material is a flexible graphite material (e.g., rope like) that has a metal alloy wire jacketing knitted over it, which may be further dipped in a fluoropolymer. As an example, a nickel alloy, such as nickel alloy 600, may be for in a jacketed braided flexible graphite. This material may exhibit anti-extrusion properties, improved material containment properties, along with improved valve stem wiping functionality. Further, in some implementations, the skive cuts, 108a and 110a, can be cut at desired angle. For example, the skive cut 110a may be cut to a 45 degree angle. Further, as installed or in operation, the skive cut 108a may be offset from the skive cut 110a in operable installation in a valve system. For example, the skive cut 108a may be one-hundred and eighty degrees offset from the skive cut 110a.

As an illustrative example, as illustrated in the implementation of FIGS. 1A, 1B, 1C, and 2, the exemplary valve packing ring system 100 is comprised of a top layer 102, a bottom layer 104, a mid-layer 106, a first end ring 108, and a second end ring 110. In this example, the top layer 102 and bottom layer 104 can respectively be made of a flexible corrosion-inhibited graphite material. In this example, the mid-layer 106 can be made of PFA (e.g., or a ring formed of a combined PFA and graphite material). In this example, the first end ring 108 and the second end ring 110 can be made of nickel alloy 600 jacketed, braided, corrosion inhibited graphite with an added polytetrafluoroethylene (PTFE) lubricant. Alternately, one or more of the respective layers 102, 104, 106 may be comprised of the combined flexible corrosion-inhibited graphite material infused with the PFA material.

In another example, one or more techniques and methods can be used to produce the implementations of packing ring systems 100 illustrated in FIGS. 1A, 1B, 1C, and 2. In some implementations, the packing system 100 may be manufactured by placing the top layer 102 on top of the mid layer 106, and putting the bottom layer 104 underneath the mid layer 106. The layers 102, 104, and 106, may be lined up, and then each layer bonded together. The first end ring 108 and second end ring 110 may further be bonded to the top of the top layer 102 and underneath the bottom layer 104.

In some implementations, a first layer of flexible graphite material can be placed on a first surface of a first layer of PFA material, where the PFA material has a second surface opposing the first surface. Further, a second layer of flexible graphite material can be placed on the second surface of the PFA material. Additionally, the layers can be bonded together using a heat treatment resulting in a flexible combined graphite-PFA sheet. As an example, bonding can be performed by applying an appropriate amount of compressive force that compresses the layers together. In other implementation, the layers can be disposed together and subjected to an appropriate temperature for an appropriate amount of time to bond the layers together. In some implementations, a combination of temperature and pressure (e.g., compressive pressure) can be used to bond the layers together. In some implementations, the heat treatment can be performed using application of force to the layers, which generates heat to bond the layers together.

In some implementations, multiple alternating layers of PFA and flexible graphite material can be bonded together to form the combined graphite-PFA sheet. Further, the resulting combined graphite-PFA sheet can be cut to form a packing ring that is configured to be used in the stuffing box of a target valve body. That is, for example, the combined graphite-PFA sheet can be die-cut to form a packing ring comprising an open center sized to operably fit around a valve stem of a target valve body, and diameter sized to fit inside a stuffing box of the target valve body to operably provide a seal at the valve stem. As an example, the target valve stem can be about 0.5 to about 1.5 inches (e.g., preferably 1 inch) in diameter, and the fitment between the packing ring and the target stuffing box can be about 0.5% of the diameter of the stem interference to 1.5% of the diameter of the stem clearance, or about 0.005 inches interference to about 0.015 inches clearance.

The top layer 102, bottom layer 104, mid layer 106, first end ring 108 and second end ring 110 may be shaped and sized create a seal around a valve stem. The top layer 102, bottom layer 104, and mid layer 106 may be sized similarly, to easily rest on top of each other. In one illustrative example, the top layer 102, bottom layer 104, and mid layer 106 may be about 0.1 to about 0.2 (e.g., preferably about 0.125) inches in height each, with an inner diameter of about 0.2 to about 0.8 (e.g., preferably about 0.438) inches, and an outer diameter of about 0.5 to about 1.0 (e.g., preferably about 0.675) inches. The first end ring 108 and the second end ring 110 may be sized similarly to evenly compress any inner layers. The first end ring 108 and the second end ring 110 may be the same size as the top layer 102, bottom layer 104, and mid layer 106, or it might be larger in size. For example, the first end ring 108 and the second end ring 110 may be about 0.2 inches in height each.

FIGS. 3A, 3B, 3C, 3D, 4, and 5 are component diagrams illustrating a second exemplary implementation of a packing ring system 300 implementing one or more systems described herein. In this implementation, the packing ring system 300 comprises at least three mid-layers 306, 308, and 310, a top layer 302 and a bottom layer 304. The top layer 302, bottom layer 304, and mid layers 306, 308, and 310 may be made of any suitable material for valve sealants, such as a graphite-based material or a fluoropolymer material. For a graphite-based material, the material may be laminated and may have additives that exhibit various desirous properties that are chosen based on the application. Such properties may be anti-corrosion and enhanced flexibility properties.

For a fluoropolymer material, the material chosen may exhibit various desirous properties that are chosen based on the application. In one example, the fluoropolymer material chosen may be perfluoroalkyl alkane (PFA), which is capable of being melt processed, allowing the material to exhibit improved flow characteristics at working temperatures, thus allowing replenishment of the fluoropolymer at the seal interface during wear. The PFA further has improved (e.g., increased) molecular chain entanglement compared to other fluoropolymer materials, which may provide improved permeation resistance. Additionally, PFA installed at ambient conditions may exhibit lower creep compared to other fluoropolymer materials. As an example, during certain applications, this characteristic of the PFA when combined with the graphite-based material may allow the graphite material to expand radially, inward towards a valve stem, and outward toward the walls of the stuffing box. In this example, any fluoroethylene-based product that is combined with the graphite material may also be carried with the expansion.

In some implementations, the fluoropolymer material may be combined with the graphite-based material, such as in a heat-treatment and/or pressure forming process, resulting in a bonding of the mid-layers 306, 308, and 310 (e.g., and/or the top layer 302, bottom layer 304). That is, for example, the bonding process allows the various layers to bond together to form a cylindrical packing seal that is comprised of a graphite-based material infused with the fluoropolymer material. In this example, the bonded packing seal comprises an open enter to receive a target valve stem, and a diameter that is sized to fit into a target packing box. In some implementations, the open center is sized to provide a slight amount or clearance, or a slight amount of interference with the valve stem, for example, depending on the application. Further, the diameter of the bonded packing seal is sized to provide a slight amount or clearance, or a slight amount of interference with the walls of the stuffing box, for example, depending on the application.

Figure 1A:
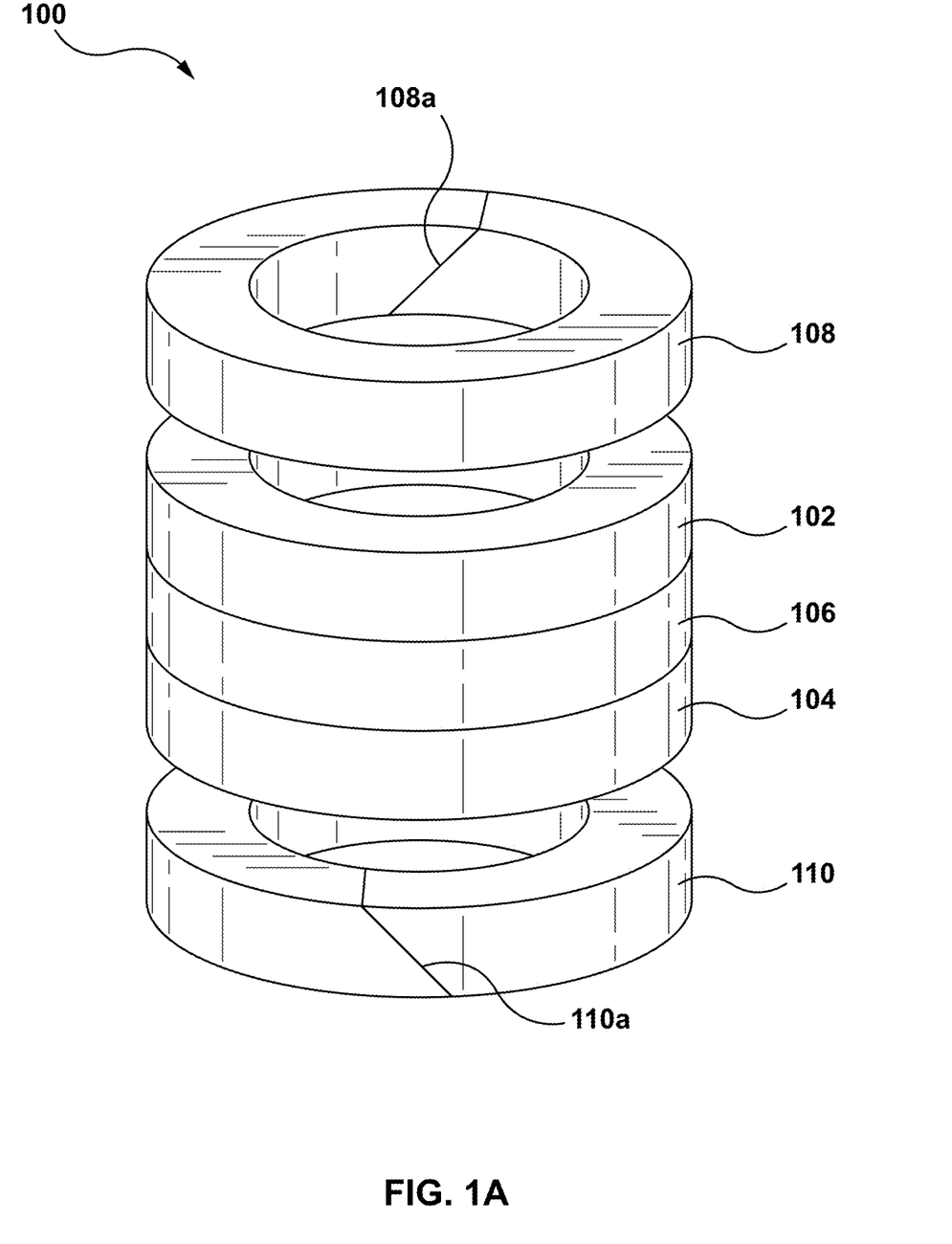
FIG. 1A is a component diagram illustrating a perspective view of an exemplary implementation of a packing ring system.
Figure 1B:
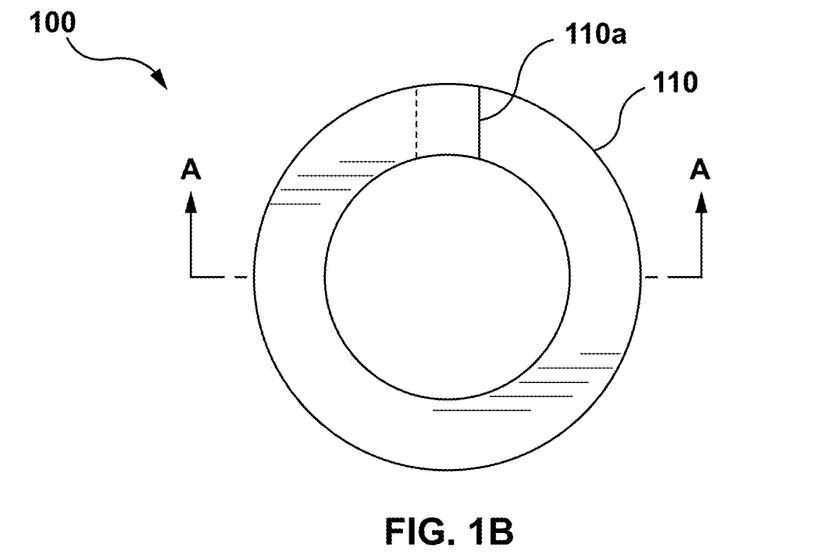
FIG. 1B is a component diagram illustrating a front side cut-away view of packing ring system.
Figure 1C:
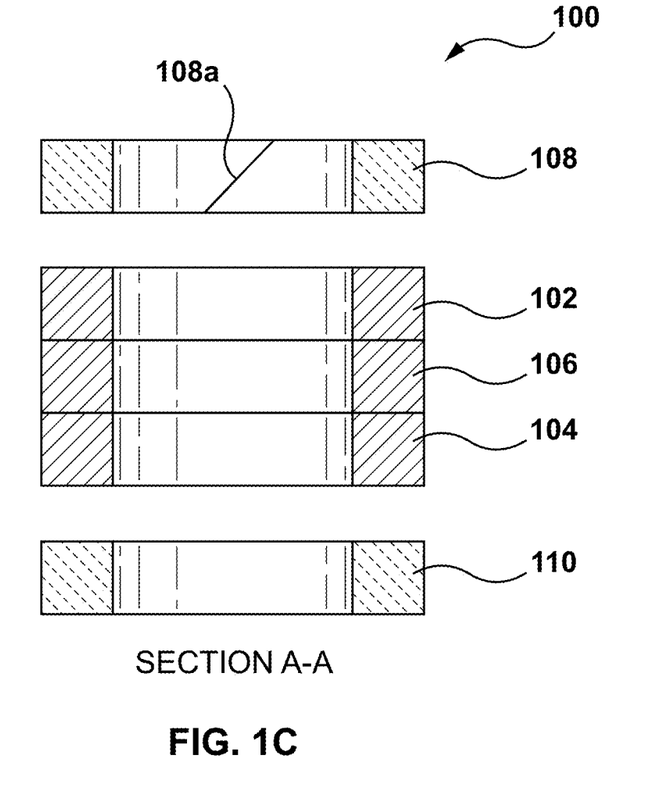
FIG. 1C is a component diagram illustrating a bottom view of a packing ring system.
Figure 2:
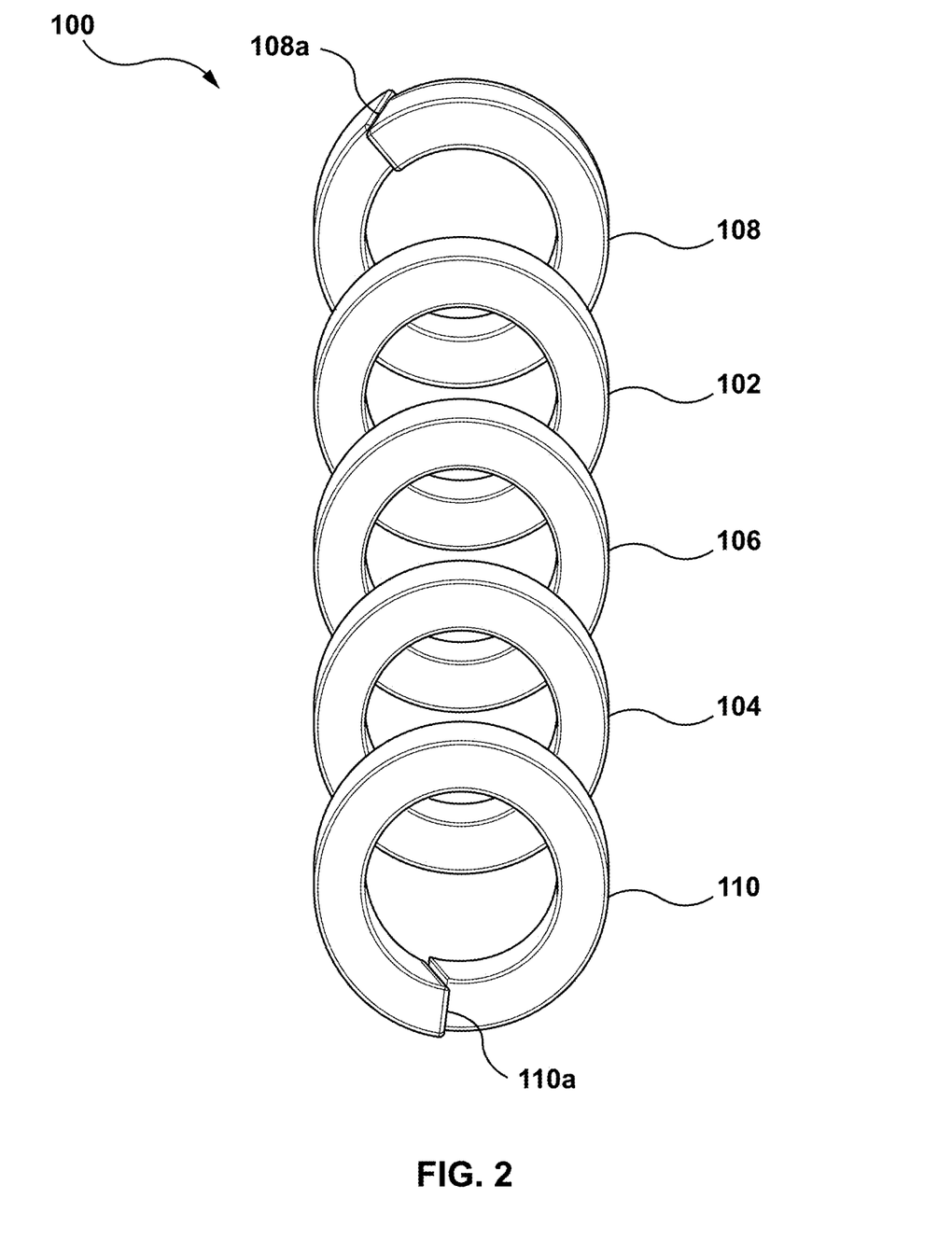
FIG. 2 is a component diagram illustrating an exploded-type view of an example packing ring system.
Figure 3A:
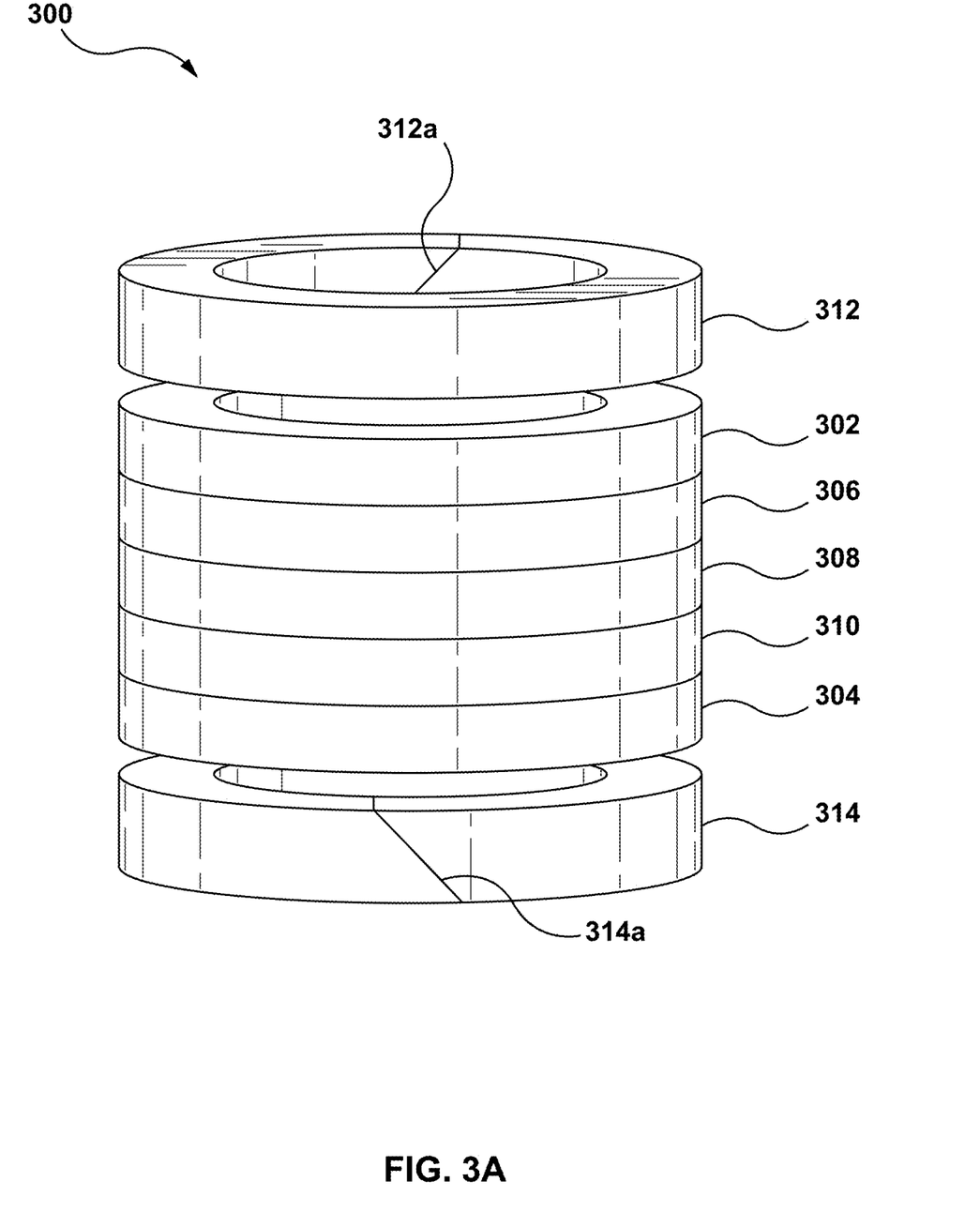
FIG. 3A is a component diagram illustrating a perspective view of an exemplary implementation of a packing ring system.
Figure 3B:
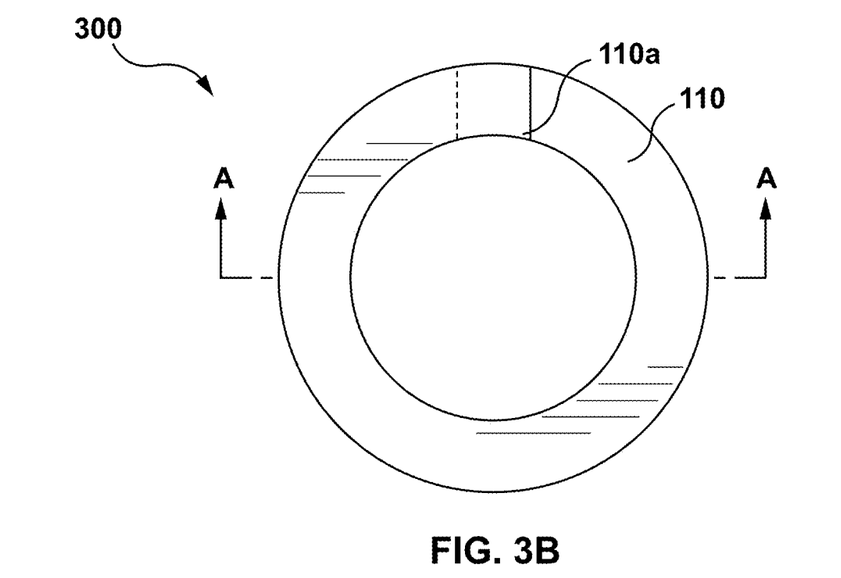
FIG. 3B is a component diagram illustrating a front side cut-away view of a packing ring system.
Figure 3C:
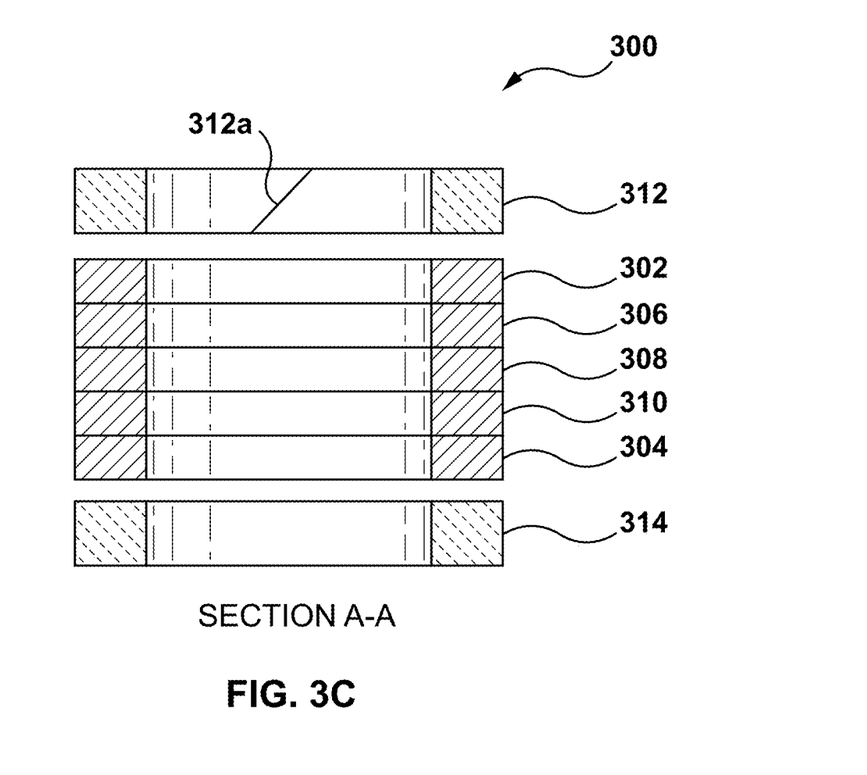
FIG. 3C is a component diagram illustrating a bottom view of a packing ring system.
Figure 4:
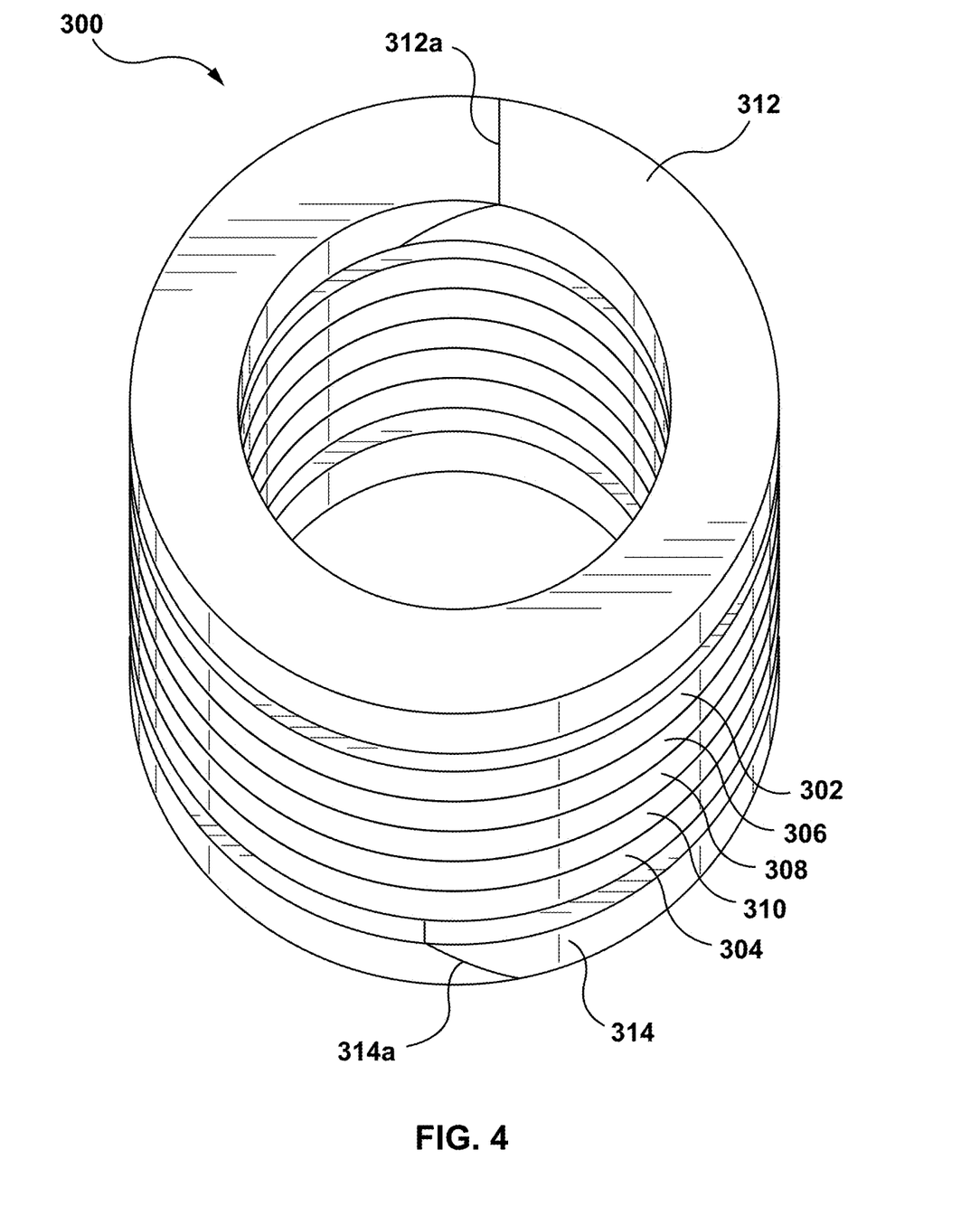
FIG. 4 is a component diagram illustrating a perspective view of the packing ring system.
Figure 8:
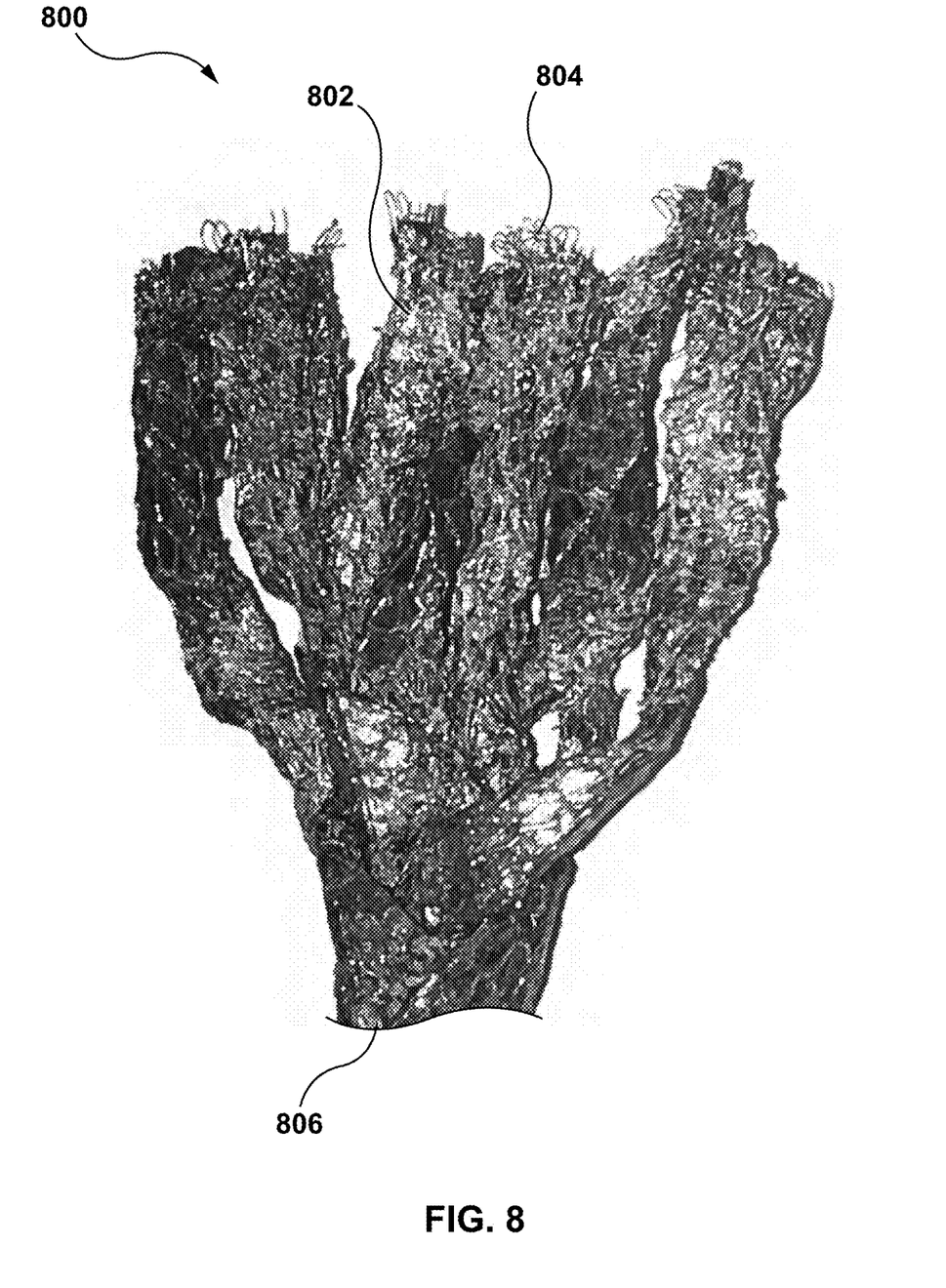
FIG. 8 is a photos of an example material knitted over and braided, and a method of manufacture.

As illustrated in FIGS. 3A, 3B, 3C, 3D, 4, and 5, the packing ring system 300 may further comprise a first end ring 312 and a second end ring 314. The first end ring 312 may have a skive cut at 312a, and the second end ring 314 may have a skive cut at 314a. The first end ring 312 and the second end ring 314 may be made of any suitable material for containing the top layer 302, bottom layer 304, and mid layers 306, 308, and 310, such as inside a target stuffing box during operation. As an illustrative example, as illustrated in FIG. 8, one such example of end ring material 800 is a flexible graphite material 802 that is knitted over with a metal alloy wire jacketing 804. In some implementations, the end ring material 800 can be dipped in a fluoropolymer 806. As one example, a suitable end ring material may be a Nickel alloy 600 jacketed braided flexible graphite. This type of material may exhibit anti-extrusion properties, improved containment properties (e.g., packing ring and/or target fluid containment), and desired valve stem wiping functionality (e.g., clearing fluid from the valve stem as it is operated). Further, for example, the wire size of the wire jacketing can be about 0.004 inches in diameter to improve clarity. The skive cuts, 312a and 314a, may be cut at an angle to a desired angle. For example, the skive cut 314a may be cut to approximately 45 degrees. As an example, as illustrated in FIGS. 3A and 4, when operably installed in a target valve system, the skive cut 312a may be offset from the skive cut 314a. For example, the skive cut 312a may be approximately 180° offset from the skive cut 314a.

Figure 5:
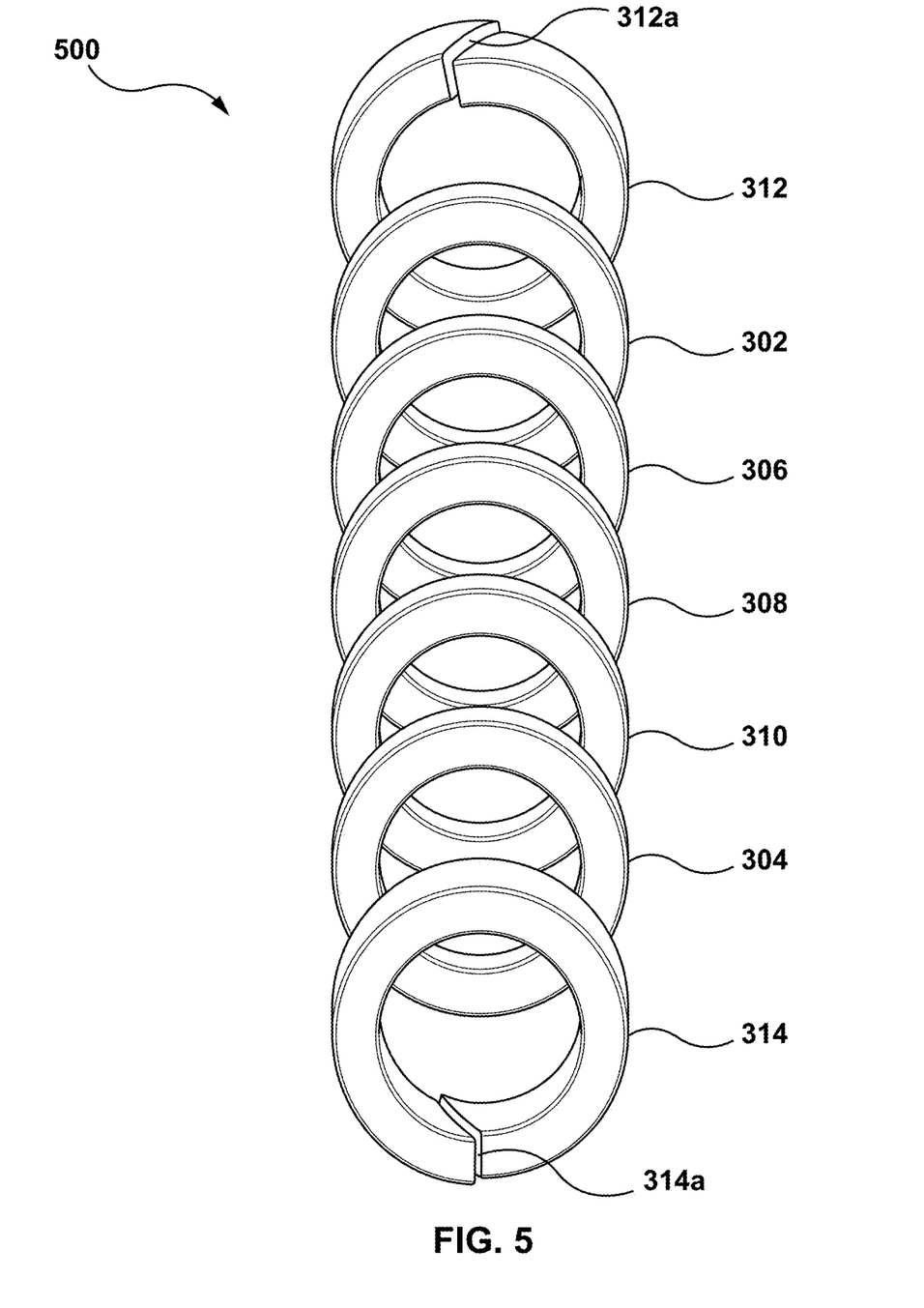
FIG. 5 is a component diagram illustrating an exploded-type view of an example packing ring system.

In one example, as illustrated in the implementation of FIG. 5, a valve packing ring system 500 is comprised of a top layer 302, a bottom layer 304, three mid-layers 306, 308, and 310, a first end ring 312, and a second end ring 314. In this example, the top layer 302 and bottom layer 304 can both be made of a flexible corrosion-inhibited graphite material. In this example, the mid-layers alternate materials with 306 and 308 made of PFA, and 304 made of a flexible corrosion-inhibited graphite material. In this example, the first end ring 312 and the second end ring 314 are made of a nickel alloy jacketed, braided, corrosion inhibited graphite with added polytetrafluoroethylene (PTFE) lubricant. Alternately, one or more of the respective 302, 304, 306, 308, 310 may be comprised of the combined flexible corrosion-inhibited graphite material infused with the PFA material. As an example, unless all of the layers 302, 304, 306, 308, 310 are comprised of the combined materials, the respective layers 302, 304, 306, 308, 310 may be alternating, such as between a combined material and a graphite-based material.

That is, for example, in some implementations, packing ring layers 302, 304, 306, 308, 310 may be alternating materials of graphite 302, PFA 304, graphite 306, PFA 308, and graphite 310. In this example, the respective packing ring layers 302, 304, 306, 308, 310 can be contained at the top and bottom by the first end ring 312, and the second end ring 314, respectively, to form the example valve packing ring system 500 (e.g., or 300). In other implementations, the respective packing ring layers 302, 304, 306, 308, 310 may each be comprised of layers of combined flexible graphite-based material and PFA that have been bonded together (e.g., in a heat and/or pressure bonding process) to form a combined packing ring sheet.

As an illustrative example, as illustrated in FIGS. 7A, 7B, 7C, and 7D, an example ring packing system (e.g., seal) can be comprised of separate rings 700, 720 (e.g., a top layer 102, 302, a bottom layer 104 304, mid layers 106, 306, 308, 310). In some implementations, the respective packing rings 700, 720 can be comprised of either a graphite-based material or a PFA material. In this implementation, the packing rings 700, 720 can be formed into a ring, such as by bonding layers of the material together, shaping, forming, extrusion, stamping, etc. In other implementations, the respective packing rings 700, 720 may be formed from alternating sheets of a flexible graphite material and sheets of PFA material. In this implementation, the alternating sheets of different materials can be bonded together (e.g., in a heat and/or pressure process) to form a unitary packing ring of the combined materials. Further, example ring packing system (e.g., seal) can be comprised of separate end rings 750, 770. As described above, the end rings 750, 770 can be comprised of a flexible graphite material that is knitted over with a metal alloy wire jacketing; and, in some implementations, the end ring material can be dipped in a fluoropolymer. Additionally, each end ring 750, 770 can comprise a skive cut 750a, 770a, to facilitate fixing the rings to the target valve stem.

Figure 9A:
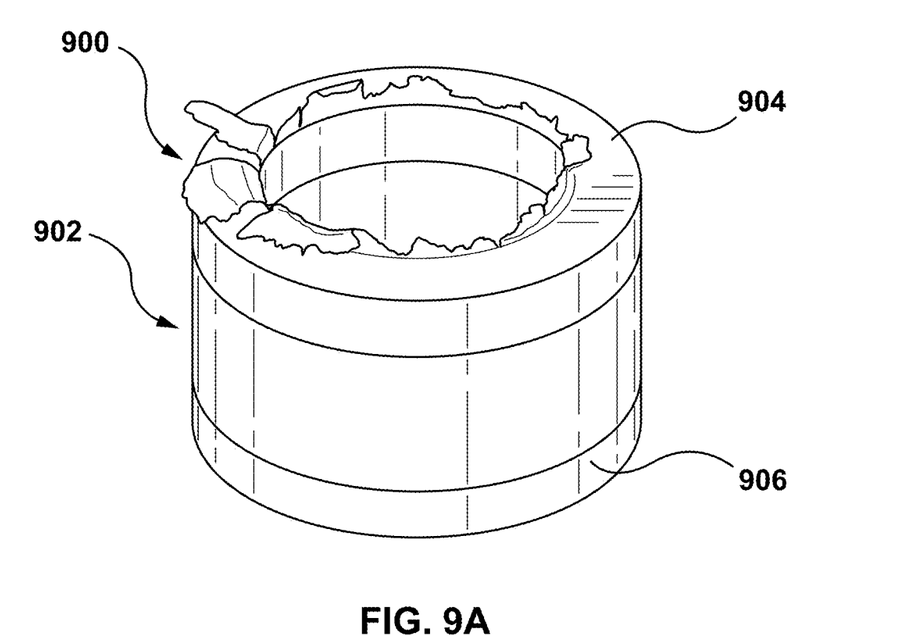
FIGS. 9A and 9B are photos of an example ring packing system in accordance with one or more implementations described herein.
Figure 9B:
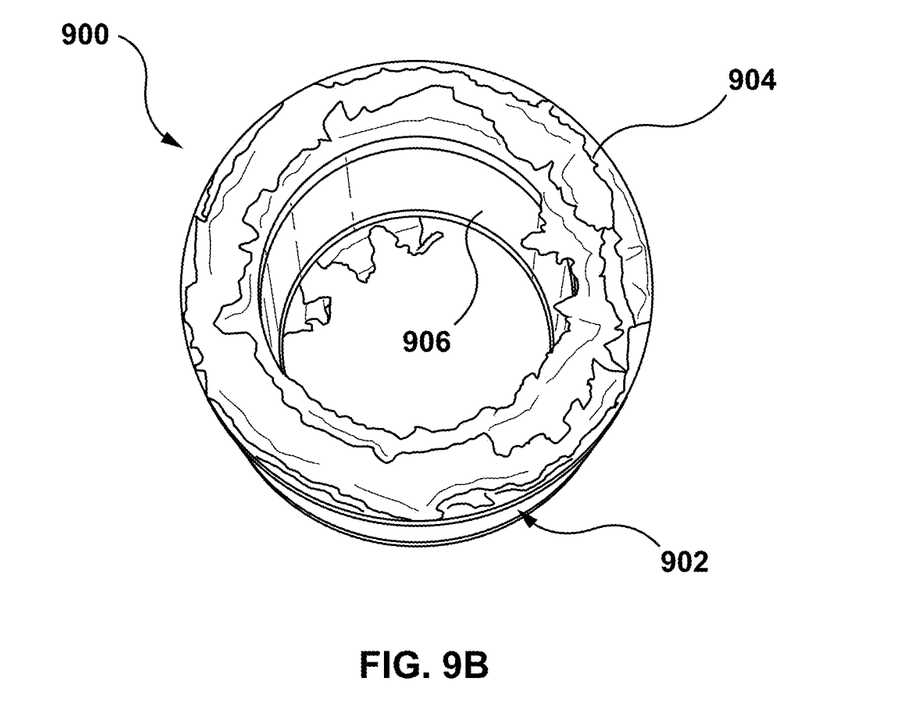

In another example, the implementation illustrated in FIGS. 2-5 may be manufactured. The packing system 300 may be manufactured by placing the top layer 302 on top of mid layers 306, putting mid layer 308 underneath mid-layer and 306, and putting mid-layer 310 underneath mid-layer 308, then placing the bottom layer 304 underneath the mid-layer 310. The layers 302, 304, 306, 308, and 310 may be lined up, and then each layer bonded together. The first end ring 312 and second end ring 314 may further be bonded to the top of the top layer 302 and underneath the bottom layer 304. As an illustrative example, as illustrated in FIGS. 9A and 9B, an example packing system 900 can comprise bonded layers (e.g., 302, 304, 306, 308, 310) of packing rings that form a body 902 of the packing system. Further, a first 904 and second 906 end ring can be combined with the body 902 to form the example packing system 900.

The top layer 302, bottom layer 304, mid layers 306, 308, and 310, and the first end ring 312 and second end ring 314 may be shaped and sized create a seal around a valve stem. The top layer 302, bottom layer 304, mid layers 306, 308, and 310 may be sized similarly, to appropriately rest on top of each other. As just one example, the top layer 302, bottom layer 304, mid layers 306, 308, and 310 may be about 0.05 to about 0.25 (e.g., preferably about 0.16) inches in height/thickness each, and have about a 0.5 to about 1.5 (e.g., preferably about 1) inch inner diameter, and about a 1.0 to about 2.0 (e.g., preferably about 1.5) inch outer diameter. The first end ring 312 and the second end ring 314 may be sized similarly to the other layers to provide for even compression and containment of the inner layers. The first end ring 312 and the second end ring 314 may be the same size as the top layer 302, bottom layer 304, mid layers 306, 308, and 310, or it might be larger in size. For example, the first end ring 312 and the second end ring 314 may be about 0.1 to about 0.9 (e.g., preferably about 0.46) inches in height/thickness each.

Figure 6:
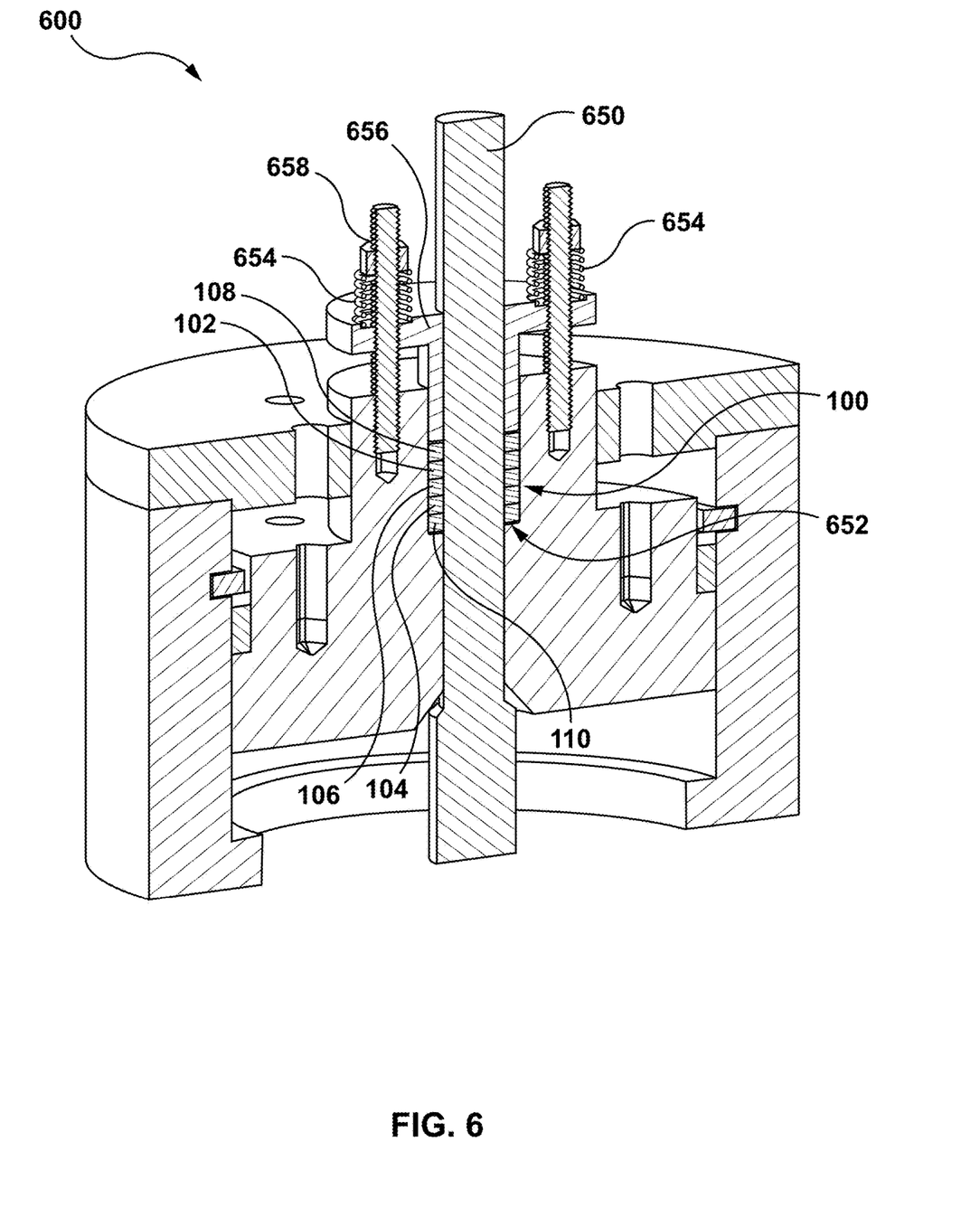
FIG. 6 is a cross-sectional view of a valve system where one or more portions of one or more packing ring system may be implemented.
Figure 7A:
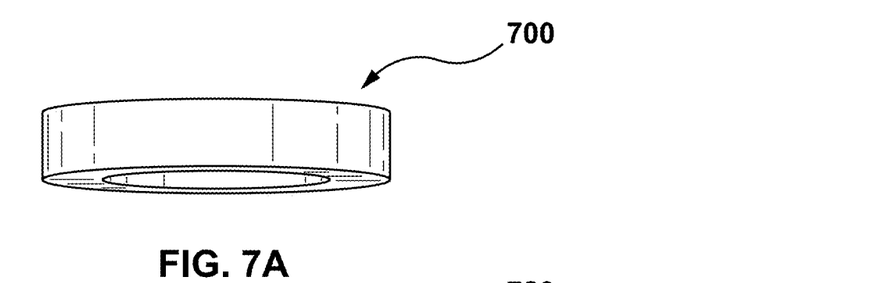
FIGS. 7A-7D are photos of an exemplary implementation of layers of a packing ring system.
Figure 7B:
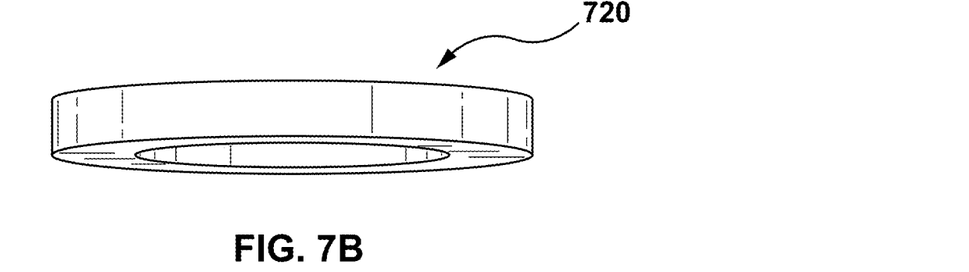
Figure 7C:
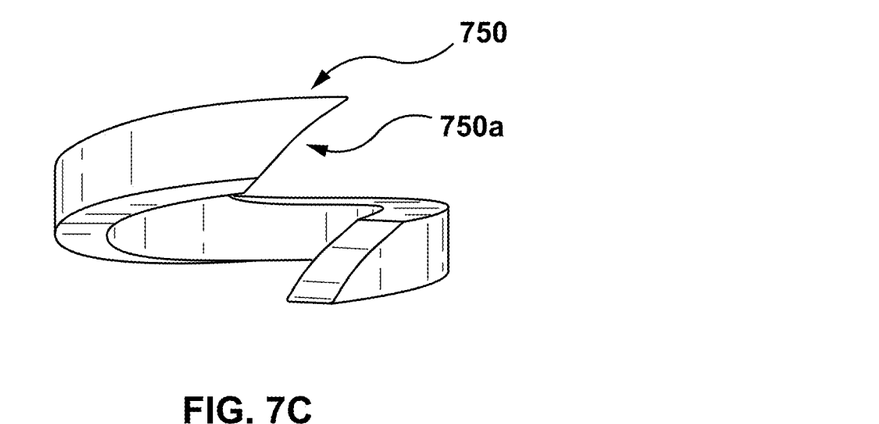
Figure 7D:
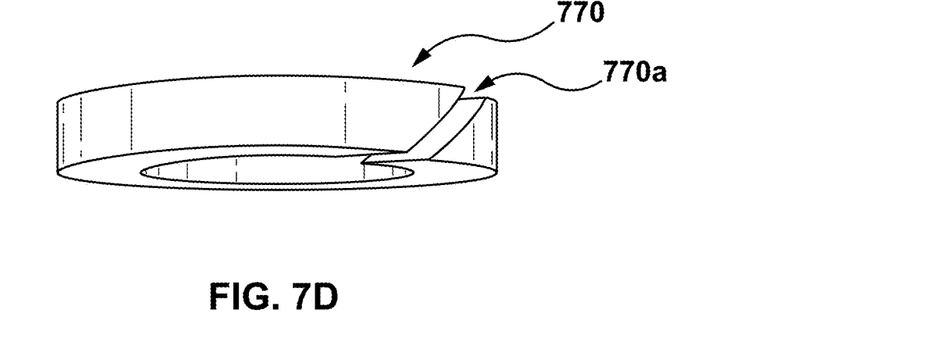

FIG. 6 is a component diagram illustrating an example environment of a valve system 600 where one or more portions of one or more systems described herein may be implemented. In this implementation, the valve system 600 comprises a valve stem 650, a stuffing box 652 (e.g., comprising internal walls), and a packing ring system 100. While the valve system 600 displays a sliding step valve system, a rotary shaft valve may also be employed. The packing ring system 100 may further have a top layer 102, a bottom layer 104, a mid-layer 106, a first end ring 108, and a second end ring 110. The valve system 600 may also have spring washers 654, (e.g., Belleville® springs), which can operably provide a selected amount of compressive force to the packing ring system 100, such as to improve and extend the performance of the packing ring system 100. That is, when the packing ring system 100 is installed in the packing box 652, a gland follower 656 is compressed onto the packing ring system 100 by threaded fasteners 658. Further, the spring washers 654 are disposed on the threaded fasteners 658 to provide for a desired, constant amount of compression. As an example, when compression is applied to the packing ring system 100 the respective layers expand radially toward the valve stem 650 and walls of the stuffing box 652. In this way, for example, an improved seal is provided for the valve system 600; and, for example, the PFA in the packing ring system 100 is carried by the graphite-based material to improve the seal and improve lubrication at the seal face.

The packing ring system 100 may form slight clearance or slight interference fit between the valve stem 650 and stuffing box 652, which enables the flexible graphite to seal and provide containment of PFA when compressed (e.g. by the gland follower 656). Slight clearance and/or slight interface fits may provide a better seal in part due to flexible graphite's low radial creep properties. The top layer 102, bottom layer 104, and mid layer 106 may exhibit low friction levels and be capable of squeezing, or exhibiting cold flow, under compression towards a valve stem 650. The clearance and the interference of the packing ring system 100 may influence the rate of leakage of fluid from inside the valve system to outside of the valve through the valve stem 650. As just one example, the clearance of the packing ring system 100 may be about 0.5% interface for 1.5% clearance of nominal value of the mating component. In one example, a 1.000 inch valve stem may have a 0.005 inch interface and a 0.015 inch clearance with the packing ring system. In another example, the clearance of the packing ring system 100 is about 0.005 inches to about 0.010 inches. In yet another example, the interference of the packing ring system 100 is about 0.005 inches to about 0.010 inches. It is anticipated that other clearance or interference values can be used with the systems descried herein to provide similar sealing properties.

A packing ring system such as 100 or 300 when employed as a sealant to a valve system such as 600 may reduce leakage of fluid from inside the valve stem 650, to comply with various emission standards. For example, the emission standards may be compliant with the EPA Method 21, API 622, 624, 641, TA-LUFT, ISO 15848, and fugitive emission standards The packing ring system, such as 100 or 300, may also be compliant with fire safety tests, such as API 589, API 607, etc. In one such fire safety test, the valve system 600 and/or packing ring system 100 or 300 is exposed to high heat for a period of time and then tested for leakage post heat application. The packing ring system disclosed herein mitigates leakage of the target fluid from the valve at an improved rate over other packing ring systems currently in use in the industry, and also provides adequate fluid containment in the event of a fire.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A packing ring for a fluid valve comprising:
   a top layer and a bottom layer, both the top layer and the bottom layer comprising a flexible graphite material; and
   one or more mid-layers comprising the flexible graphite material or a perfluoroalkoxy alkane (PFA) material;
   wherein the one or more mid-layers are disposed between the top layer and the bottom layer;
   wherein respective one or more mid-layers are disposed parallel to an adjoining layer;
   wherein the plurality of mid-layers, top layer, and bottom layer are bonded together forming a cylindrical shape; and
   wherein the cylindrical shape comprises an open center, wherein the open center extends through the formed cylindrical shape, and has an axis perpendicular to the plurality of mid-layers, top layer, and bottom layer.

2. The packing ring of claim 1, the respective one or more mid-layers comprise alternating layers of the flexible graphite material and the PFA material.

3. The packing ring of claim 1, wherein the respective of mid-layers comprises one layer of PFA material.

4. The packing ring of claim 1, wherein the respective mid-layers comprises two layers of PFA material and one layer of flexible graphite material, wherein the flexible graphite material is oriented perpendicular to the cylindrical shape axis.

5. The packing ring of claim 1, wherein the plurality of mid-layers and/or the top layer and/or the bottom layer are comprised of a combination of the flexible graphite material and the PFA material that are fused together by a heat treatment, wherein the flexible graphite material is oriented perpendicular to the cylindrical axis.

6. The packing ring of any of claim 1, wherein the open center is fixed to operably dispose the respective layers in contact with a target valve stem in a valve body stuffing box, and form a clearance or interference fit between the valve stem and the stuffing box.

7. The packing ring of claim 6, wherein the clearance of the fit between the bonded plurality of mid-layers, top layer, and bottom layer and the stuffing box is about 0.005 inches.

8. The packing ring of claim 1, further comprising a first end ring and a second end ring, the first end ring disposed on top of the top layer, and the second end ring disposed below the bottom layer.

9. The packing ring of claim 8, wherein the first end ring and the second end ring comprise a flexible graphite material knitted over with metal alloy wire jacketing.

10. The packing ring of claim 9, wherein the flexible graphite material over-knitted with metal alloy wire jacketing is coated with a fluoropolymer.

11. The packing ring of claim 9, wherein the metal alloy wire of the wire jacketing comprises a diameter of about 0.004 inches.

12. The packing ring of claim 8, wherein the first end ring and second end ring comprise die molded anti-galling metal wireknit mesh.

13. The packing ring of claim 8, wherein the first end ring and second end ring are comprised of a die molded packing ring with formed metal foil cap anti-extrusion device.

14. The packing ring of claim 8, wherein the first and second end rings comprise 10-30% PTFE by weight, comprise 10-50% metal alloy wire by weight, and the balance comprising flexible graphite or a flexible graphite and carrier.

15. The packing ring of claim 1, wherein the graphite material comprises a corrosion-inhibited graphite material, and comprises a height/width of about 0.015 inches.

16. The packing ring of claim 1, wherein the PFA material comprises a height/width of about 0.001 inches.

17. The packing ring of claim 1, wherein the mid layers comprise 3-20% PFA by weight.

18. A sealing system for a fluid valve comprising:
   a packing ring comprising one or more mid-layers, respective mid-layers comprising a flexible corrosion-inhibited graphite material or a perfluoroalkoxy alkane (PFA) material,
   a top layer and a bottom layer, both the top layer and the bottom layer comprising the flexible graphite material,
   wherein the one or more mid-layers are disposed between the top layer and the bottom layer, and the mid-layers comprise alternating layers of the flexible graphite material and the PFA material,
   wherein respective layers are disposed parallel to an adjoining layer,
   wherein the packing ring is cylindrical in shape with an open center, the open center extending through the plurality of mid-layers, top layer, and bottom layer, and having an axis perpendicular to the plurality of layers; and
   a valve stem, wherein the valve stem extends through the open center and the packing ring forms an interference fit between the valve stem and a stuffing box in which the valve stem is disposed.

19. The packing ring of claim 18, wherein the valve stem is about 1 inch in diameter, and the fitment between the packing ring and the stuffing box is about 0.5% of the diameter of the stem interference to 1.5% of the diameter of the stem clearance, or is about 0.005 inches interference to about 0.015 inches clearance.

20. The packing ring of claim 18, wherein the packing ring further comprises a first end ring and a second end ring, the first end ring disposed on top of the packing ring and the second end ring disposed on bottom of the packing ring.

21. The packing ring of claim 20, wherein the first end ring and the second end ring comprise a flexible graphite material knitted over with a metal alloy wire jacketing and coated with PTFE.

22. A method of manufacturing a packing ring comprising:
   placing a first layer of flexible graphite material on a first surface of a first layer of PFA material, wherein the PFA material has a second surface opposing the first surface;
   placing a second layer of flexible graphite material on the second surface of the PFA material; and
   bonding the layers together using a heat treatment resulting in a flexible combined graphite-PFA sheet.

23. The method of claim 22, further comprising die cutting the combined graphite-PFA sheet to form a packing ring comprising an open center sized to operably fit around a valve stem of a target valve body, and diameter sized to fit inside a stuffing box of the target valve body to operably provide a seal at the valve stem.

24. The method of claim 22, comprising applying compressive pressure to the layers during heat treatment.

* * * * *